Patented Nov. 12, 1946

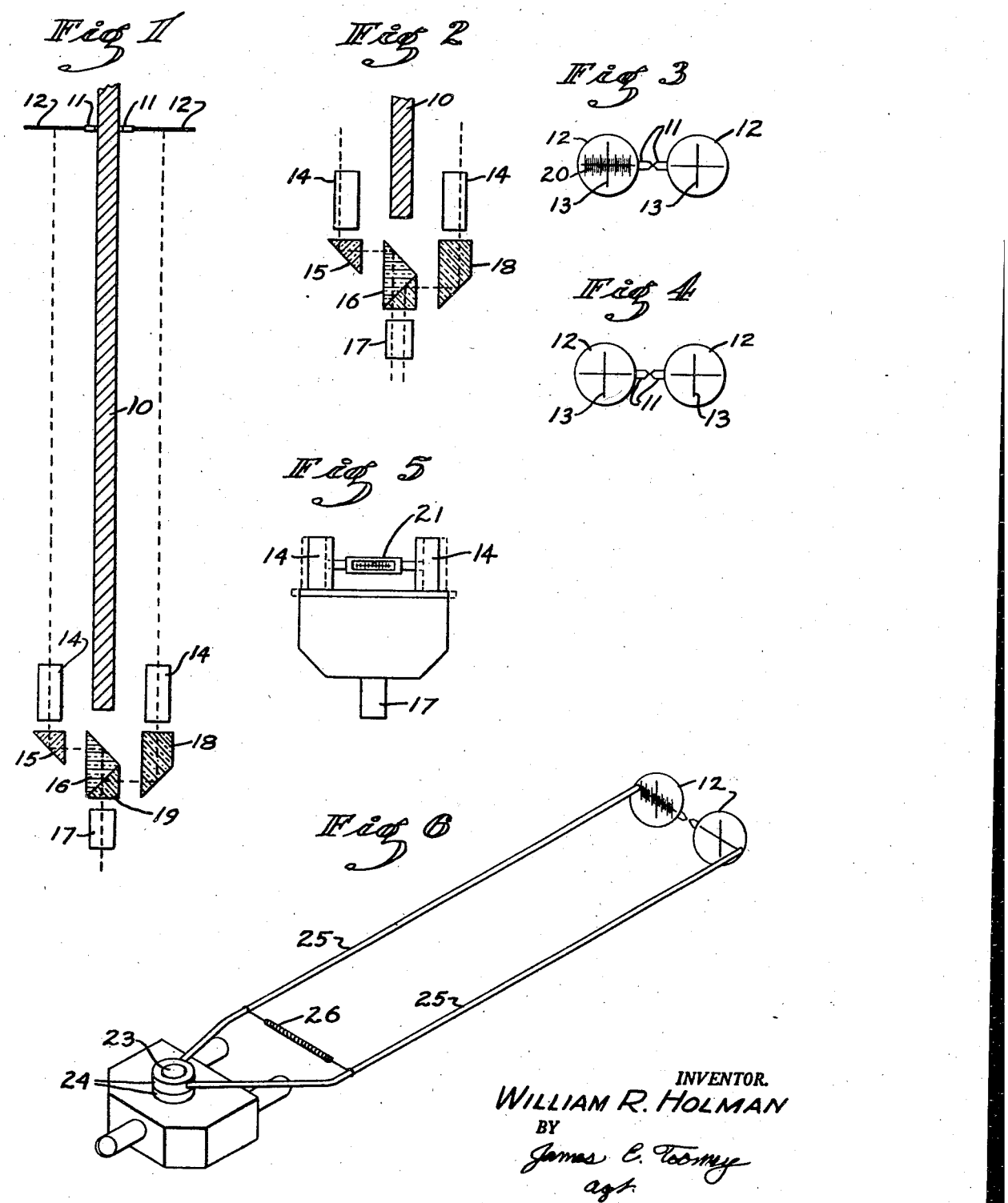

2,410,942

UNITED STATES PATENT OFFICE 2,410,942

OPTICAL THICKNESS GAUGE

William R. Holman, Vallejo, Calif., assignor to The Permanente Metals Corporation, Oakland, Calif., a corporation of Delaware Application January 2, 1945, Serial No. 571,050

3 Claims. (Cl. 88—1)

This invention relates to measuring gauges and particularly to an optical gauge adapted to determine the thickness or other dimensions of members inaccessible to caliper-like instruments.

For example the wall thickness of a piece of pipe is ordinarily gauged adjacent the end of the pipe with a caliper micrometer or similar instrument and it must be assumed that the thickness throughout the length of the pipe is uniform. It is sometimes necessary to determine the thickness of a member such as a pipe wall or large plate at a point remote from its edge where calipers cannot be employed. An instance of such necessity arises in the case of elongated tubular retorts which are subjected to high temperatures and other causes which effect a reduction in thickness of the metal of which they are constructed. It is desirable from time to time to examine the thickness of the retort wall at points several feet in from its open end. Instruments constructed in the manner of calipers which comprise connected arms with points for contact with opposite sides of the member to be gauged are impractical for such use because of their size, and the fact that any flexibility in their construction results in inaccuracy.

It is the object of the present invention to provide apparatus for determining thickness of members in relatively inaccessible positions and to provide such apparatus wherein reference points are set up adjacent the member to be gauged on opposite sides thereof and optically projected to a common point for convenient comparison. Further objects and advantages of the invention are made apparent in the following specification wherein it is described in detail with reference to the accompanying drawing in which a preferred form of the invention is illustrated.

In the drawing:

Fig. 1 is a diagrammatic illustration of an optical thickness gauge embodying the present invention, showing the manner of its use, Fig. 2 is a similar illustration of a portion of the same gauge showing the results of a different adjustment of certain parts thereof, Fig. 3 is a view in front elevation of a pair of target members which form a part of the apparatus, Fig. 4 is a similar view of a modified form of the target members shown in Fig. 3, Fig. 5 is a plan view of an adjustable binocular eyepiece used with the target members shown in Fig. 4, and Fig. 6 is an isometric view of a complete gauge apparatus illustrating one means which may be employed for supporting target members with relation to the binocular eyepiece.

In general the invention comprises a pair of feelers which may be brought into contact with opposite sides of a member to be gauged for thickness. Each feeler carries a target with a visible reference line thereon spaced a known distance from the end of the feeler. The two targets disposed directly opposite each other are viewed simultaneously through properly spaced lenses and a combination of reflecting prisms so that both are visible in superimposition through a single eyepiece. If the spacing of the reference lines is equal to the spacing of the objective lenses their images are precisely superimposed and as the distance from the reference lines to the ends of the feelers is known the space between the ends of the feelers or the thickness of the member which separates them can be obtained by simple mathematical deduction. The necessity for such deduction is however eliminated by the structures herein disclosed which make possible a direct reading on a scale, of the distance which separates the feelers.

Referring for example to Figure 1 of the drawing a plate 10 is shown as illustrating a section through a piece of pipe or the wall of a retort or even a piece of flat plate in which it is desired to gauge thickness at a point remote from its edge where ordinary calipers might be used. A pair of feelers 11 (see also Figs. 3 and 4), are brought into contact with opposite sides of the plate in the area to be gauged. Each of the feelers 11 carries a target 12 in the form of a card. A vertical reference line 13 is provided on each target and may be crossed by a horizontal line, as shown, to aid in orienting the targets, although the latter line is not employed in gauging the distance between the ends of the feelers 11.

A system of lenses and prisms as diagrammatically shown in Fig. 1 is employed to view the targets 12. This system is assembled in the same manner as a binocular eyepiece used in conjunction with certain microscopes and the like but it is reversed so that the two eyepieces may be replaced by telescopic lenses. Thus, the target viewing apparatus, as shown in Figure 1, comprises a pair of telescopic objective lenses 14, a pair of prisms 15 and 16 which reflect the image from one lens 14 through a single eyepiece lens 17, and a second pair of prisms 18 and 19 which similarly reflect the image of the other objective lens so that images of the two targets 12 are viewed through the eyepiece 17 in superimposed relation to each other.

Assuming now that the spacing between the centers of the objective lenses 14 is the same as that between the vertical reference lines 13 on the targets, the projected images of the two reference lines will follow the paths indicated in dotted lines in Figure 1 and they will be observed through the single eyepiece 17 as directly superimposed. If, however, the spacing is varied either between the reference lines or between the centers of the objective lenses the images will follow different paths as shown by dotted lines in Figure 2 and will be viewed separately through the eyepiece.

According to one method of practicing the invention the objective lenses may be spaced apart a fixed distance. The targets are then marked with the reference lines 13 to coincide when viewed through the eyepiece when the ends of the feelers 11 are in contact with each other. One target is then marked off with a visible scale as indicated at 20 in Fig. 3 and the distance between the ends of the feelers when they are brought into contact with a member to be gauged is observed through the eyepiece by the apparent position of the reference line on one target with relation to the scale on the other target.

Through a modification of the invention the targets may be marked each with a single vertical reference line as shown in Fig. 4 and the lens and prism assembly which is incorporated in a suitable case as illustrated in Fig. 5 may be made so that the objective lenses are adjustable to and away from each other as from the full line to the dotted line positions indicated. A calibrated gauge 21 connects the lenses to indicate the magnitude of their adjustment. With this modification the reference lines are placed on the targets to coincide in the eyepiece 17 when the feelers 11 are in contact with each other and when the gauge 21 is set for a zero reading. If the feelers are spaced apart the objective lenses must be moved apart to make the reference lines coincide and the movement of the lenses registered on the scale 21 corresponds to the distance between the feelers.

One of the principal advantages of this invention is that it eliminates the necessity for any physical connection between feelers of the gauge or between the targets from which a reading is taken. Thus the rigidity and accuracy of construction of mechanical micrometers is unnecessary and the thickness of a plate or wall may be determined at a point several feet from its edge as readily as at a point close to its edge. As there is no necessity for connection between the feelers they may be supported by any means available and it is contemplated that they be made of magnetized iron so that they will secure themselves by attraction to iron or steel plates or by mutual attraction through members of non-magnetic material.

It may be desirable for some uses, however, to provide some support for the feelers and targets which will simplify their orientation in direct opposition to each other on opposite sides of the member to be gauged, and in proper relation to the lenses through which they are viewed. An apparatus suitable for this purpose is shown in Fig. 6 of the drawing. The casing which accommodates the lenses and prisms is provided with a vertically extending trunnion 23 upon which are rotatably supported a pair of collars 24. Each of the collars carries an elongated rod 25 which supports one of the targets and feelers at its outer end in position to be brought into cooperating positions on opposite sides of an intermediate plate to be gauged. A spring 26 may be employed to urge the rods 25 toward each other, and the targets may be made adjustable lengthwise of the rods or the rods themselves may be made to vary in length by means not shown. The supporting rods 25 may be of very light construction as they function only as supports for the feelers and targets and have no bearing on the accuracy of the gauging operation which is accomplished independently of any such mechanical connections as set forth above.

I claim:

1. A thickness gauge comprising a pair of target members engageable with opposite sides of a member to be gauged, and means for viewing said target members simultaneously in superimposed relation including a pair of objective lenses aligned with the target members, a single eyepiece lens and prismatic reflectors for directing the images from the objective lenses to the eyepiece lens, said targets having reference lines thereon positioned to be spaced apart in their superimposed images a distance corresponding to the thickness of the members being gauged, means to adjust the spacing of the objective lenses to bring the images of the reference lines into registry, and means to indicate the extent of said adjustment.

2. A thickness gauge comprising a pair of target members engageable with opposite sides of a member to be gauged, and means for viewing said target members simultaneously in superimposed relation including a pair of objective lenses aligned with said target members, a single eyepiece lens and prismatic reflectors for directing the images from the objective lenses to the eyepiece lens, said targets having reference lines thereon positioned to be spaced apart in their superimposed images a distance corresponding to the thickness of the member being gauged, means to adjust the spacing of the objective lenses to bring the images of the reference lines into registry, and a scale disposed between said objective lenses whereby the extent of said adjustment is measured.

3. A thickness gauge comprising a pair of visible target members including feelers of magnetized iron engageable with opposite sides of a member to be gauged, and means for viewing said target members simultaneously in superimposed relation including a pair of objective lenses aligned with said target members, a single eyepiece lens and prismatic reflectors for directing the images from the objective lenses to the eyepiece lens, said targets having reference lines thereon positioned to be spaced apart in their superimposed images a distance corresponding to the thickness of the members being gauged, means to adjust the spacing of the objective lenses to bring the images of the reference lines into registry, and means to indicate the extent of said adjustment.

WILLIAM R. HOLMAN.